United States Patent [19]

Dahlgren et al.

[11] Patent Number: 5,143,038

[45] Date of Patent: Sep. 1, 1992

[54] INTERNAL COMBUSTION ENGINE WITH DELAYED CHARGING

[75] Inventors: Jan Dahlgren, Göthenburg; Jan Karlsson, Västra Frölunda, both of Sweden

[73] Assignee: AB Volvo, a Swedish Body Corporate, Göthenburg, Sweden

[21] Appl. No.: 707,066

[22] Filed: May 29, 1991

[30] Foreign Application Priority Data

May 30, 1990 [SE] Sweden .............................. 9001941-5

[51] Int. Cl.5 ................................................ F02D 9/10
[52] U.S. Cl. ............................... 123/403; 123/52 MF
[58] Field of Search .................. 123/52 MF, 337, 403, 123/405, 73 V

[56] References Cited

U.S. PATENT DOCUMENTS

| | | | |
|---|---|---|---|
| 3,814,069 | 6/1974 | Croft et al. ..................... | 123/52 MF |
| 4,363,302 | 12/1982 | Pischinger ........................... | 123/403 |
| 4,691,670 | 9/1987 | Bönisch et al. ................. | 123/52 MF |
| 4,949,681 | 8/1990 | Schatz et al. ................... | 123/52 MF |
| 4,955,329 | 9/1990 | D'Angelo et al. ............ | 123/52 MF |
| 4,981,123 | 1/1991 | Schatz ................................. | 123/403 |
| 5,033,419 | 7/1991 | Plohberger et al. ............. | 123/73 V |

FOREIGN PATENT DOCUMENTS 3707635  9/1988  Fed. Rep. of Germany ...... 123/403

Primary Examiner—Willis R. Wolfe
Attorney, Agent, or Firm—Burns, Doane, Swecker & Mathis

[57] ABSTRACT

An internal combustion engine includes at least one valve flap mounted for swinging movement in the intake duct upstream in the cylinder intake valve. The flap is magnetically attracted to a closed position when an electromagnetic is activated, in order to effect a delayed charging of the cylinder. When the electromagnet is fully or partially deactivated, a pressure differential acting across the flap swings the flap open.

5 Claims, 3 Drawing Sheets

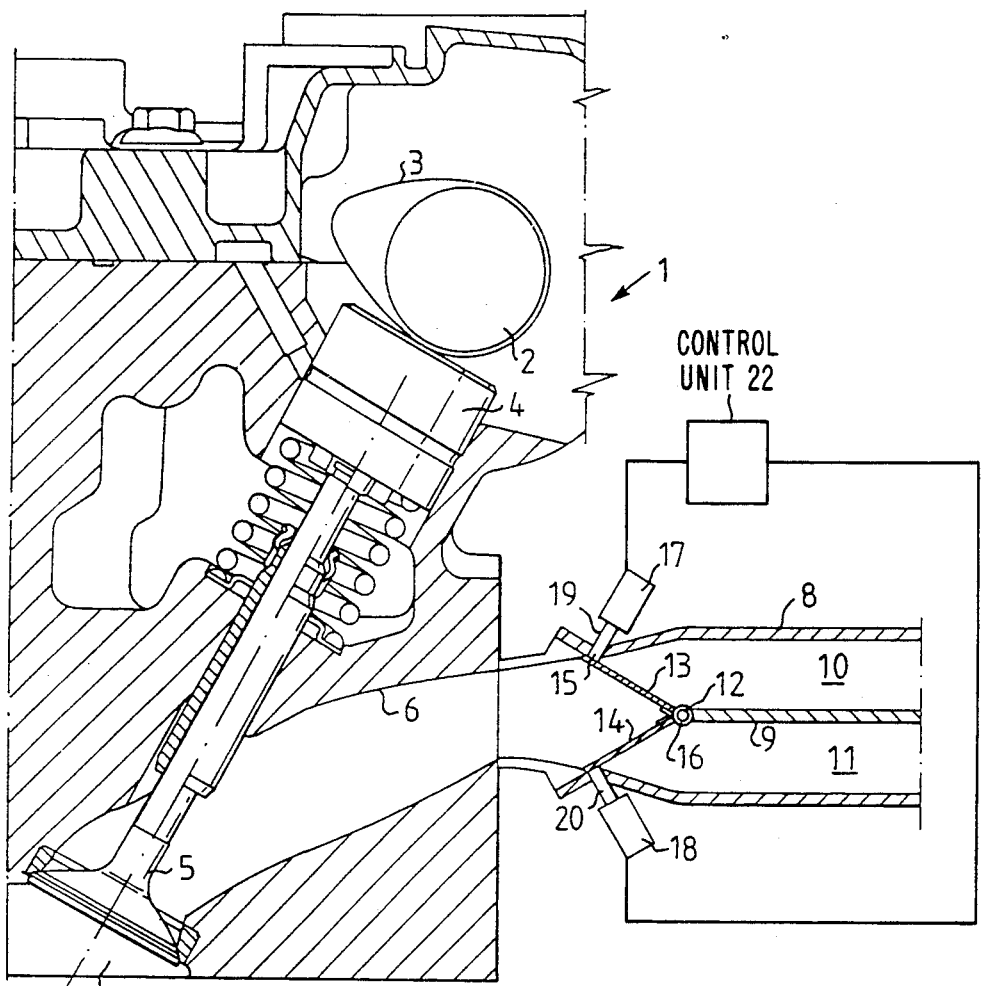
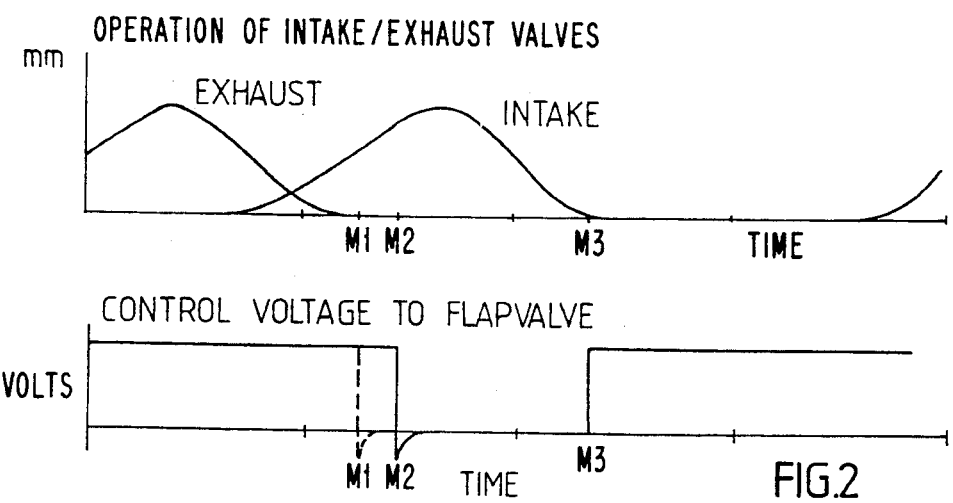
FIG.1
FIG.2

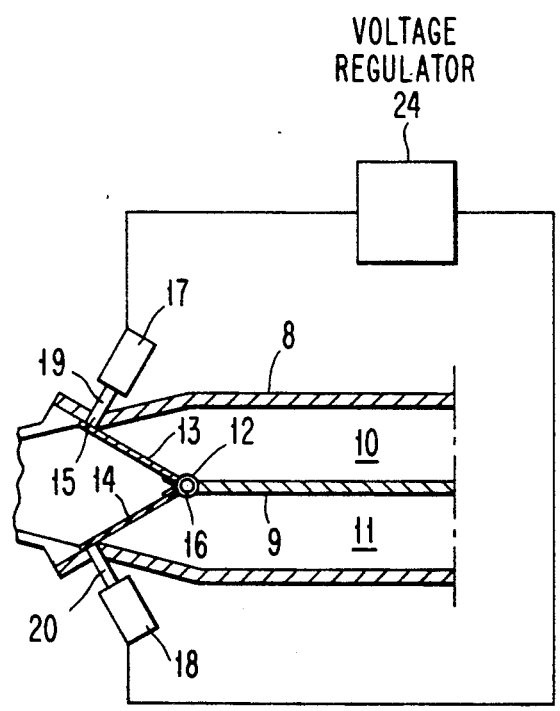

INTERNAL COMBUSTION ENGINE WITH DELAYED CHARGING

BACKGROUND OF THE INVENTION

The present invention relates to an internal combustion engine, comprising a valve arranged in the intake duct of the respective cylinder chamber. The valve is located upstream of the cylinder intake valve and, in its closed position, seals the intake duct to prevent the fuel air mixture from flowing into the cylinder chamber during the initial phase of the intake stroke of the respective piston. The valve is controlled at a certain point in time to open the duct so that the fuel-air mixture can flow freely into the cylinder chamber.

Modern automobile engines, which have intake air systems with tuned intake manifolds, have a relatively narrow optimum range for optimum operation, and this must be placed within the R.P.M. range of most frequent engine operation at normal driving speed. At lower engine speeds and even to a certain extent at higher engine speeds, the optimum degree of filling of the cylinder chamber cannot be obtained due to the fact that a sufficient amount of fuel-air mixture is not supplied to the engine cylinders. At low engine speeds, both the engine efficiency and driving comfort will be poorer than within the engine speed range for which the intake manifolds are tuned.

For quite some time, it has been known to utilize so-called delayed charging to increase the degree of filling of the engine and the torque, primarily at low engine speeds, i.e., at rpm values below that for which the intake manifolds are tuned. Delayed or pulse charging can be achieved with the aid of auxiliary valves in the intake manifolds, which auxiliary valves are held closed during the initial phase of the intake stroke, thus creating a negative pressure in the cylinder camber. At a certain point in time, (i.e., according to the principle: the lower the rpm, that much later in the intake stroke), the auxiliary valve is opened, and the fuel-air mixture is allowed to flow into the cylinder. The pulse effect thus provides a "supercharging" which increases the engine torque.

In a known internal combustion engine with delayed charging (e.g., see German Document DE 33 28 879), an auxiliary valve device in the form of a pair of rotatably driven disc-shaped valve elements is disposed in the engine intake manifold The discs have circumferentially extending slots which expose the cross-section of the intake manifold once per revolution. This design thus provides for a gradual exposing of the flow cross-section of the intake manifold when the front edge of the slot moves across the cross-section and a gradual closing when the rear edge of the slot moves across the cross-section.

In general, the faster the auxiliary valve in the intake manifold can open, the greater will be the pulse effect and thus the charging. The purpose of the present invention is to provide, for an internal combustion engine, such an auxiliary valve device which (1) can open more rapidly than the above-described conventional auxiliary valve device, (2) is simple in construction, and (3) can be controlled to precisely adapt its valve times to the current engine speed and load.

SUMMARY OF THE INVENTION

This is achieved according to the invention by virtue of the fact that the auxiliary valve comprises at least one flap mounted for swinging movement in the intake duct, the valve flap cooperating with an electromagnetic operating mechanism which, in the activated state, keeps the valve flap in its closed position.

Such a valve flap placed in a magnetic field generated by a permanently mounted electromagnet in the intake manifold can be made with low weight. Since it does not need to be physically connected to a special operating means, the design as a shoe will be not only light in weight, but also simple and inexpensive. The low weight involves very little inertia and thus the reaction time of the auxiliary valve will be short. The electromagnetic control of the auxiliary valve makes it possible to use the same control principles as are used in controlling engine ignition, and this makes it possible to achieve, in a very simple manner, a very precise control of the auxiliary valve operation in relation to engine speed and load.

BRIEF DESCRIPTION OF THE DRAWINGS

The objects and advantages of the invention will become apparent from the following detailed description of preferred embodiments thereof in connection with the accompanying drawings in which like numerals designate like elements, and in which:

FIG. 1 shows a cross-section through a portion of a cylinder head having an intake manifold;

FIG. 2 is a diagram illustrating how the flap operation is related to the ordinary engine valve operation;

FIG. 5 is a fragmentary view of FIG. 1 depicting an alternate type of controller.

EMBODIMENTS OF THE INVENTION

Figure 3:
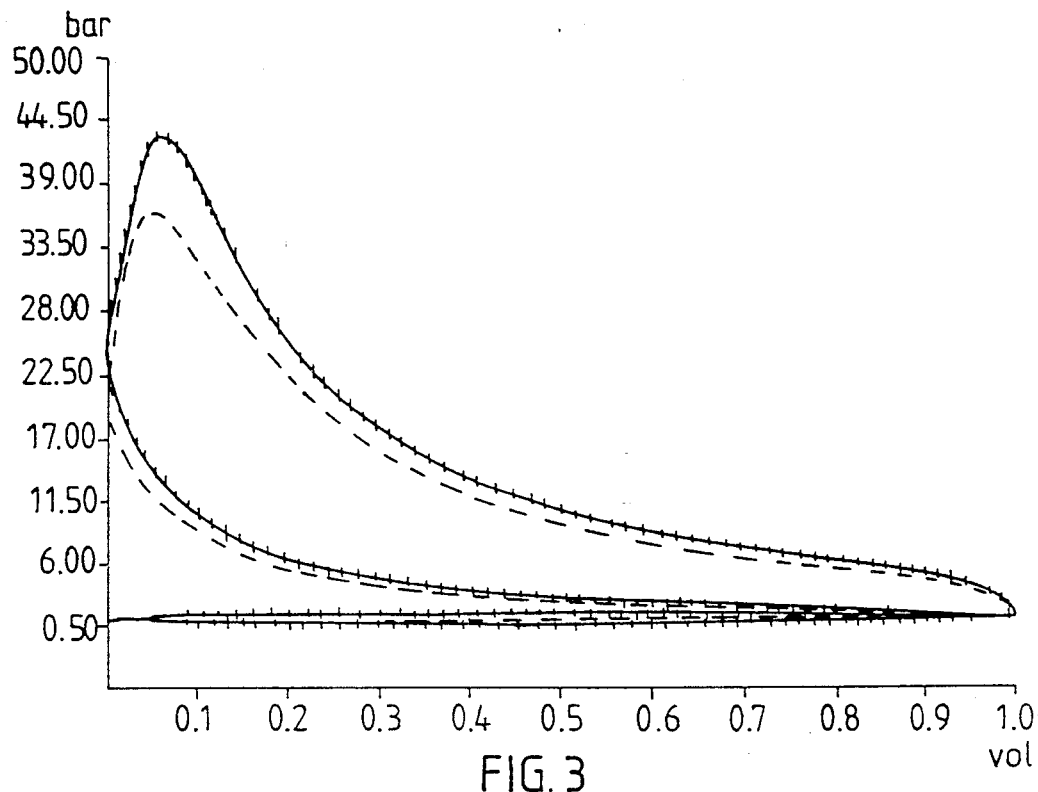
FIG. 3 is an indicator diagram comparing the work performed by an engine having delayed charging according to the present invention, with the work performed by the same engine without delayed charging.

In FIG. 1, a portion of a cylinder head i of an is depicted. Only one of the cam shafts 2 is shown in FIG. 1. The respective cam 3 controls via valve lifters 4 the intake valves 5 in the intake ducts 6, which lead to the respective cylinder chambers 7. An intake pipe 8 is connected to the duct 6 shown, and this pipe can be one of four branches of an intake manifold to a four-cylinder engine, the other branches (not shown) connecting in a corresponding manner to respective intake ducts leading to the other cylinder chambers of the engine.

Each intake pipe 8 is divided by a partition wall 9 into two passages 10 and 11. At the end of the wall 9 proximate the cylinder head, there is mounted a pin 12. The pin 12 supports an auxiliary valve arrangement in the form of a pair of valve flaps 13, 14. The pin can, for example, be fixed in the intake pipe 8, with the flaps 13, 14 being mounted on the pin 12 on the same principle as a "piano hinge". The flaps 13, 14 have such a shape (semicircular, semi-elliptical or the like) that they, in the closed position shown in FIG. 1 (in which they form an acute angle with each other), seal against a flange in the intake pipe 8, the flange serving as a valve seat. In the position of the valve flaps 13, 14 shown in FIG. 1, the communication is thus broken between the intake pipe 8 upstream of the flaps 13, 14 and the intake duct 6. The pin 12 supports a weak helical spring !6, which exerts a small torsional force striving to keep the flaps in the closed position shown.

Electromagnets 17, 18 are fixed outside the intake pipe 8 and are operable to create magnetic fields in the intake pipe near the valve seat flange 15. FIG. 1 shows schematically two diametrically opposed electromagnets 17, 18, the magnet bars 19, 20 of which extend through the wall of the intake pipe 8 an have their inner ends flush with the valve seat flange 15. Depending on the design of the electromagnets 17, 18 and the flange 15, a magnetic field can be crated about the entire flange 15 or parts thereof when current is supplied to the electromagnets. The flaps 13, 14 are completely or partially made of a magnetic material, and this means that under the influence of the electromagnetic attractive force, they will be held against the flange 15 when the current is turned on.

In the initial phase of the intake stroke of the cylinder, there occurs a negative pressure in the cylinder chamber. With the flaps 13, 14 closed, there is thus created a pressure difference across the flaps, whereby a resulting flap-opening force is applied to the flaps. The flaps can be controlled to open in accordance with two embodiments which are different in principle.

According to the first embodiment, a control unit 22 receives signals indicative of vehicle operation, e.g., engine speed and load, and, in response thereto, supplies signals to the electromagnets 17, 18 which are capable of breaking the current to one or both of the electromagnets. When the current is broken, the respective flap(s) is able to be swung to a position parallel to the flow direction by the pressure differential thereacross. Also, the control unit can be operated to cause a momentary pole reversal of the current as the valve is opened in order to "demagnetize" the valve flaps to avoid residual magnetism. The pole reversal also creates a repellant force, which to a certain extent can contribute to the very rapid opening reaction of the valve.

According to the second embodiment, shown in FIG. 5 the control unit 22 is replaced by a voltage regulator 24 in order to control the attractive force of the magnets. The voltage regulator regulates the magnitude of the voltage supplied to the electromagnets 17, 18 as a function of vehicle operating parameters, such as engine speed and load, as mentioned above (although the unit 22 and voltage regulator 24 could also emit signals as a function of other parameters in either embodiment). As the voltage supplied to the electromagnets is varied, the magnetic attractive force thereof will also be varied. Hence, the valve flap(s) will open when the force crated by the pressure different over the flap(s) becomes greater than the magnetic attractive force.

The diagram in FIG. 2 illustrates when the voltage to the electromagnets is turned on in relation to the opening times of the exhaust and intake valves in an arrangement controlled according to the fist embodiment described above. The upper graph plots the extent of opening and closing of the intake and exhaust valves as a function of time. The lower graph plots the supply of voltage to the flap valve(s) as a function of time. When the current is broken by the control unit 22, the electromagnets release the flaps, which then open in response to the pressure differential thereacross. Depending on the engine speed, the moment of release is varied between a moment M1 when the exhaust valve is completely closed and a moment M2 when the intake valve has been opened about two-thirds. When the intake valve has been completely closed at moment M3, current is supplied again. (The force of the weak spring 15 itself could return the valve flaps 13, 14 to their closed position since there is no longer a negative pressure on the suction side.)

Figure 4:
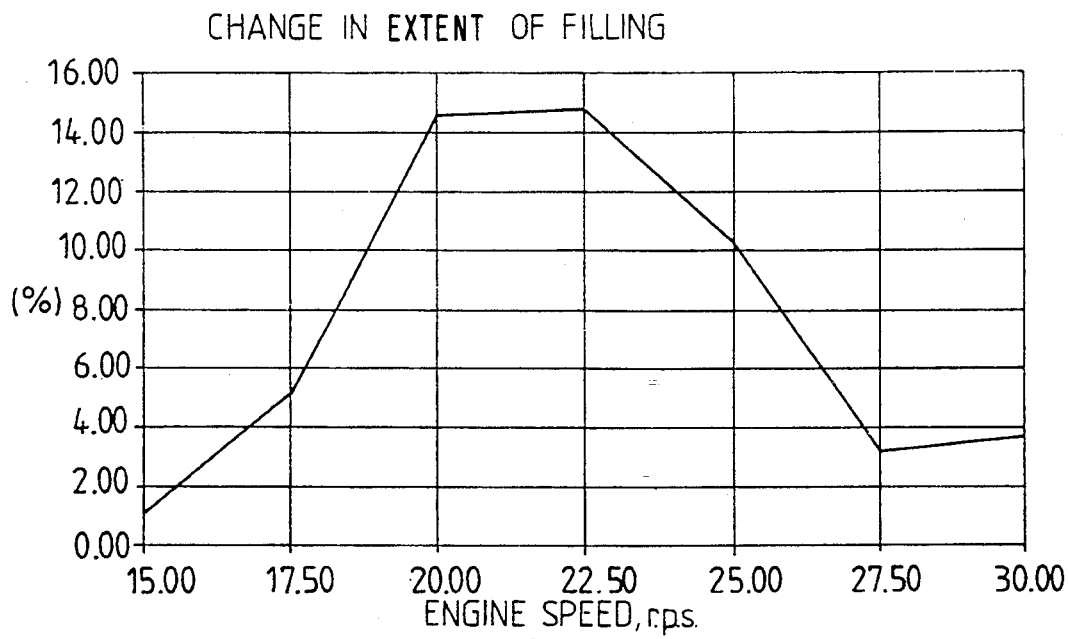
FIG. 4 is a diagram illustrating the change in the extent of filling as a function of engine speed.

FIG. 3 shows an indicator diagram in which the vertical axis represents the pressure in the cylinder chamber, and the horizontal axis represents the volume of the cylinder chamber (i.e., the right end of the horizontal axis represents the volume with the piston at lower dead center, and the left end represents the volume with the piston at top dead center). The two depicted curves depict the work performed by two engines, respectively. In particular the sold line curve shows the indicated work of an engine having the above-described auxiliary valve arrangement for delayed charging according to the present invention. The dashed line curve shows the indicated work for the same engine without delayed charging. The diagram shows that the present invention provides about 15% additional torque. The change in the extent of filling of the cylinder chambers as a function of engine speed is shown in the diagram in FIG. 4.

The engine described above has an intake pipe 8 divided by an intermediate wall 9 into two passages 10 and 11 with two valve flaps 13, 14, which, in their closed position, have a V-shaped configuration so that they function as non-return valves and prevent return flow during the overlap between the opening phases of the exhaust and intake valves. The valve flaps can open individually or together to open one or both passages.

The invention is, of course, not limited to such an arrangement. Most engines lack this partition of the intake pipe into two passages, having only one passage or duct per cylinder. But even in such a case, two valve flaps according to the present invention, i.e., hinged on a pin centrally mounted in the single duct, could be used. In such a case, both flaps would always be synchronized.

Within the scope of the invention, a single hinged flap could of course be used instead of two flaps. The flap could be mounted in such a way that the non-return valve function is provided.

Instead of hinged flaps, flaps of flexible material could be provided, each being fixed at one of its ends in cantilever fashion. The flaps would open by flexing about their fixed ends.

In the embodiments described above, one flap valve arrangement per cylinder is used, but it is also possible to coordinate one flap valve arrangement with several cylinders.

If the valve is opened later than as described above for maximum degree of filling, turbulence in the combustion chamber can increase. In combination with the flap valve arrangement described, the ordinary intake valves of the engine can be allowed to open earlier and close later.

Although the present invention has been described in connection with preferred embodiments thereof, it will be appreciated by those skilled in the art that additions, modifications, substitutions, and deletions not specifically described may be made without departing from the spirit and scope of the invention as defined in the appended claims.

What is claimed is:

1. In an internal combustion engine comprising a cylinder chamber, a piston in said cylinder chamber, an intake duct leading to said cylinder chamber, cylinder intake valve means for said cylinder chamber, auxiliary valve means arranged in said intake duct upstream of said intake valve means, and controlling means for controlling said auxiliary valve means to close said auxiliary valve means during an initial phase of an intake stroke of said piston to delay the flow of air-fuel mixture into said cylinder chamber, the improvement wherein said auxiliary valve means comprises two flaps, each flap being mounted at one end thereof such that the opposite end thereof is swingable between open and closed positions, said controlling means comprising electromagnetic operating means having activated and deactivated states, said electromagnetic operating means holding flaps in their closed positions during said activated state, said flaps arranged to swing in relatively opposite directions toward their closed positions, said mounted end of each flap being situated at a generally central location in said intake duct, said intake duct comprising two separate passages separated by a partition wall, said flaps being arranged across respective ones of said passages.

2. An engine according to claim 1, wherein said flaps are arranged in said intake duct such that a pressure at the downstream sides of said flaps which is greater than pressure at the upstream sides of said flaps applies a flap-closing force to said flaps, whereas a greater pressure at said upstream sides than at said downstream sides applies a flap-opening force to said flaps.

3. An engine according to claim 1, wherein said flaps are spring-biased toward their closed positions.

4. An engine according to claim 2, wherein at least a portion of said flaps is formed of magnetizable material, said electromagnetic operating means being arranged to create a magnetic field which produces a magnetic force attracting said flaps toward their closed positions.

5. An engine according to claim 1, wherein said flaps are pivotably mounted on a common pin.

* * * * *